(12) United States Patent
Murray et al.

(10) Patent No.: US 8,379,698 B2
(45) Date of Patent: Feb. 19, 2013

(54) WIRELESS FREQUENCY-DOMAIN MULTI-CHANNEL COMMUNICATIONS

(75) Inventors: Boyd McGregor Murray, North Epping (AU); David Andrew Abbott, Abbotsford (AU); Joseph Abraham Pathikulangara, Epping (AU); John Bunton, St. Clair (AU); Valeriy Dyadyuk, Cremorne (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 601 days.

(21) Appl. No.: 12/517,742

(22) PCT Filed: Sep. 25, 2007

(86) PCT No.: PCT/AU2007/001419
§ 371 (c)(1),
(2), (4) Date: Feb. 4, 2010

(87) PCT Pub. No.: WO2008/067584
PCT Pub. Date: Jun. 12, 2008

(65) Prior Publication Data
US 2010/0142598 A1    Jun. 10, 2010

(30) Foreign Application Priority Data
Dec. 5, 2006 (AU) ................................ 2006906812

(51) Int. Cl.
H04B 1/38    (2006.01)
(52) U.S. Cl. ........................... 375/219; 375/220; 375/73
(58) Field of Classification Search ................... 375/219
See application file for complete search history.

(56) References Cited

U.S. PATENT DOCUMENTS
(Continued)

FOREIGN PATENT DOCUMENTS
EP    1 650 920    4/2006
WO    WO 96/21305 A1    7/1996
(Continued)

OTHER PUBLICATIONS

International Search Report dated Nov. 29, 2007 corresponding to PCT/AU2007/001419 application from Australian Patent Office (two pages).

(Continued)

*Primary Examiner* — David Ometz
*Assistant Examiner* — Santiago Garcia
(74) *Attorney, Agent, or Firm* — Kilpatrick Townsend & Stockton LLP

(57) ABSTRACT

A circuit for transmission and reception of multi-channel communications is disclosed. The transmitter path includes a digital modulation circuit receiving multiple channel binary data, and for each channel generating a digital representation of the data. A digital-to-analogue (D/A) conversion circuit (140-146) is provided for each data channel. Each D/A conversion circuit receives and converts respective channel digital representations to produce a resultant band limited analogue signal (148-154). The band limitation arises due to a characteristic of said channel digital representations. A bandpass filter (156-162) receives and filters each analogue channel signal. The bandwidth to the start of the stop band of each bandpass filter is wider than a respective band limited analogue channel signal and wider than the Nyquist bandwidth arising from the sampling rate of said D/A conversion circuit. In this way, signal power in unwanted Nyquist zones is effectively removed. A frequency translation circuit (172-188) abuts the multiple channel bandpass filtered analogue signals in the frequency domain without any guard bands between adjacent channel signals.

16 Claims, 11 Drawing Sheets

U.S. PATENT DOCUMENTS

| | | | |
|---|---|---|---|
| 4,075,429 A * | 2/1978 | Takahata et al. | 370/204 |
| 4,646,165 A * | 2/1987 | Hirota | 386/300 |
| 4,888,557 A | 12/1989 | Puckette, IV et al. | |
| 5,748,623 A * | 5/1998 | Sawahashi et al. | 370/342 |
| 5,910,978 A * | 6/1999 | Maytal et al. | 379/93.01 |
| 6,249,249 B1 * | 6/2001 | Obayashi et al. | 342/371 |
| 6,353,629 B1 * | 3/2002 | Pal | 375/222 |
| 6,452,977 B1 * | 9/2002 | Goldston et al. | 375/260 |
| 6,724,335 B1 * | 4/2004 | Gomez et al. | 341/144 |
| 7,046,153 B2 * | 5/2006 | Oja et al. | 340/573.4 |
| 7,058,037 B1 * | 6/2006 | Moon | 370/335 |
| 7,095,798 B2 * | 8/2006 | Hunton | 375/296 |
| 7,113,559 B2 * | 9/2006 | Baas et al. | 375/350 |
| 7,570,702 B2 * | 8/2009 | Waltho et al. | 375/295 |
| 7,783,291 B2 * | 8/2010 | Feher | 455/440 |
| 7,860,174 B2 * | 12/2010 | Hammerschmidt et al. | 375/260 |
| 2003/0112890 A1 * | 6/2003 | Kroeger et al. | 375/296 |
| 2003/0214926 A1 * | 11/2003 | Choi et al. | 370/335 |
| 2005/0110565 A1 * | 5/2005 | Robinson | 330/124 R |
| 2007/0200743 A1 * | 8/2007 | Gunzelmann et al. | 341/144 |
| 2008/0291083 A1 * | 11/2008 | Chang | 342/354 |
| 2009/0154377 A1 * | 6/2009 | Tsuda et al. | 370/277 |
| 2010/0054357 A1 * | 3/2010 | Fujimura et al. | 375/267 |

FOREIGN PATENT DOCUMENTS

| | | |
|---|---|---|
| WO | WO 99/07093 A2 | 2/1999 |
| WO | WO 00/65799 A1 | 11/2000 |

OTHER PUBLICATIONS

International Preliminary Report on Patentability dated Apr. 7, 2008 from the Australian Patent Office (three pages).

Brankovic, Veselin, et al., "High Data Rate Wireless System Solution: 60 GHz / 5 GHz Dual Frequency Operation," *Sony International (Europe) GmbH*, pp. 196-199, (Dec. 2009).

* cited by examiner

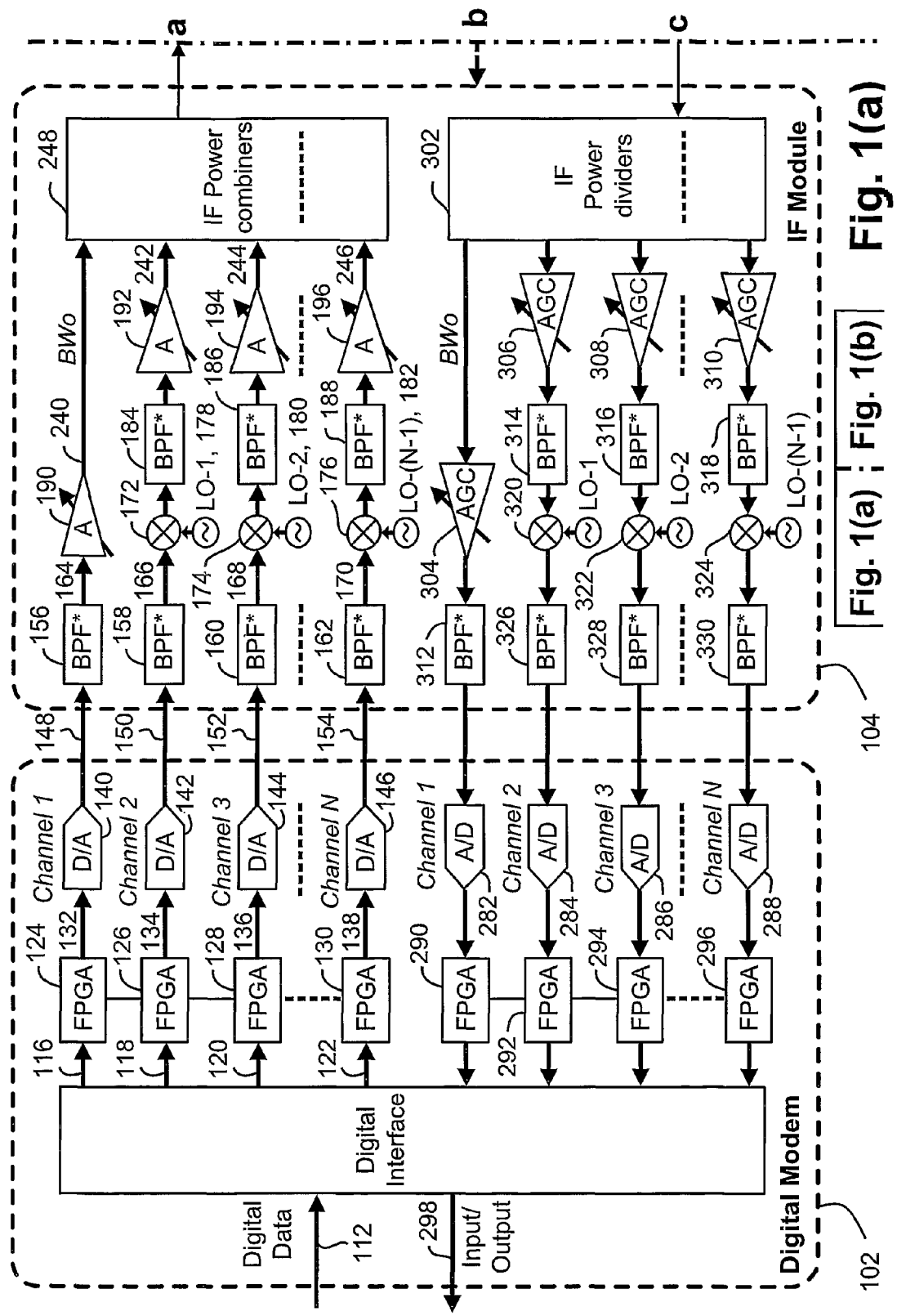

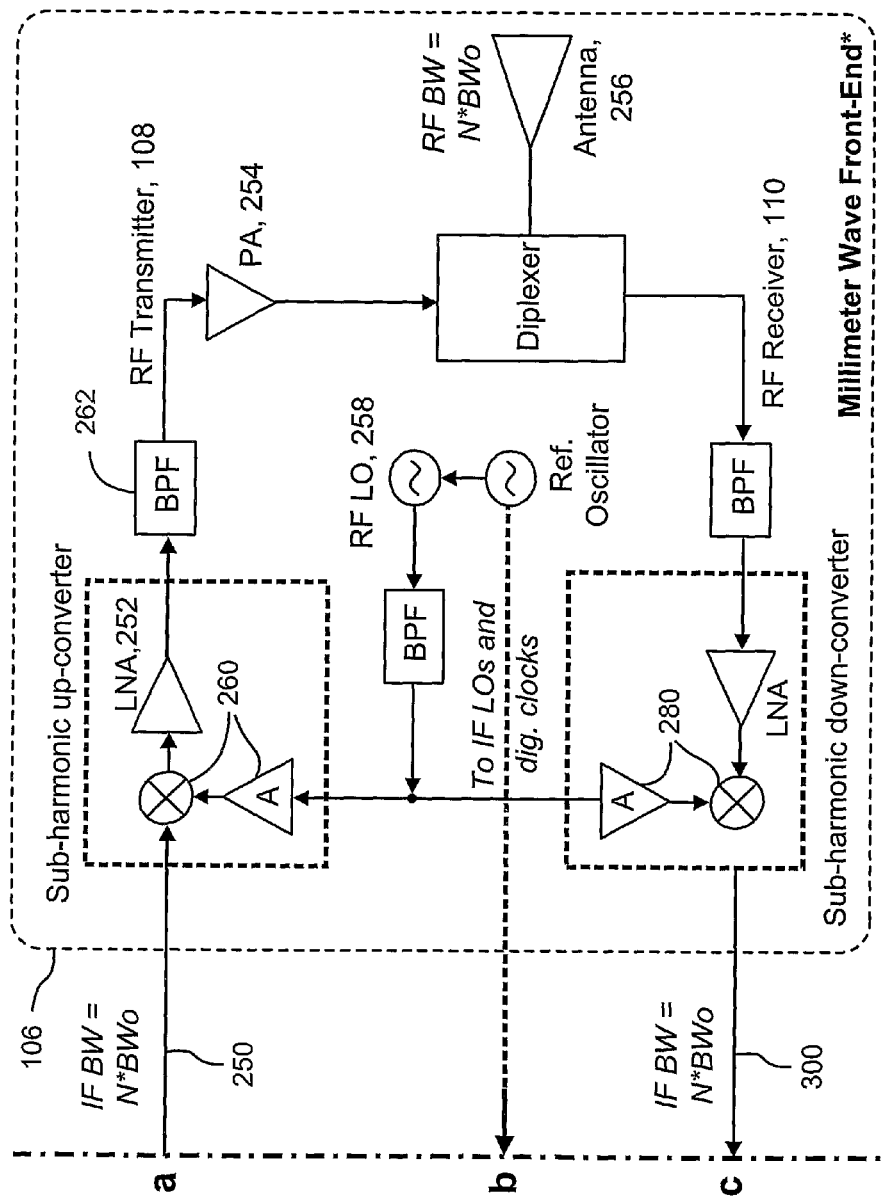

WIRELESS FREQUENCY-DOMAIN MULTI-CHANNEL COMMUNICATIONS

CROSS REFERENCE TO RELATED APPLICATIONS

This application is a National Stage of International Application No. PCT/AU2007/001419 filed Sep. 25, 2007 and which claims the benefit of Australian Patent Application No. 2006906812, filed Dec. 5, 2006, the entireties of which are incorporated by reference herein.

FIELD OF THE INVENTION

This invention relates to wireless digital communications, and particularly to frequency-domain multi-channel communications.

BACKGROUND

Multi-gigabit wireless communications at millimeter-wave frequencies are emerging as an important technology for future ubiquitous communications networks. This can be attributed partly to an ever-increasing demand for bandwidth and scarcity of the wireless spectrum, and partly to the decreasing cost of millimeter-wave monolithic integrated circuits (MMIC) which make transmission and receiving devices cheap to produce.

While known fiber optic data transfer devices can provide multi-gigabit per second (Gbps) data rates, infrastructure costs are high and deployment can take years. The wireless alternative is very attractive due to its low cost and rapid deployment. Currently, commercial mm-wave devices are focused on wireless personal area network (WPAN) applications at 60 GHz. These devices are analogue, and typically implement amplitude shift keying (ASK) modulation or binary phase shift keying (BPSK) modulation by controlling the bias voltage of a Gunn-diode oscillator. However, the 60 GHz band is suitable only for short range communications (e.g. indoor) because of higher propagation loss due to oxygen absorption of the propagated radio waves in this band.

Point-to-point wireless links in the at millimeter-wave spectrum currently exist, and use transmitters and receivers implementing modulation techniques such as ASK or BPSK, but have poor characteristic spectral efficiencies of below 1 bit per hertz, and are limited to speeds only up to 1.25 gigabit per second (Gbps).

The recently allocated 71-76 and 81-86 GHz bands in the USA and Europe provide impetus for wireless links with longer range and higher data rates. A practical difficulty is that wireless digital communications devices can not yet achieve such high frequencies. On the other hand, in the analogue domain, real analogue-to-digital (A/D) converters/filters and digital-to-analogue (D/A) converters/filters can not operate at multi-Gbps. While multi-channel approaches may overcome this issue, frequency-domain multiplexing using analogue filters requires frequency guard bands between adjacent radio channels, which is an inefficient use of the available bandwidth. An example is given in Brankovic, et al "High Data Rate Wireless System Solution: 60 GHz/5 GHz Dual Frequency Operation", 11$^{th}$ IEEE International & Symposium on Personal, Indoor and Mobile Communications, 2000. The Brankovic system uses an OFDM approach with 32 MHz guard bands.

The present invention seeks to overcome or at least reduce one or more of the forgoing problems, or to provide an alternative.

SUMMARY

Therefore, there is provided a circuit comprising:

a digital modulation circuit receiving multiple channel binary data, and for each channel generating a digital representation;

a digital-to-analogue (D/A) conversion circuit for each data channel, each said D/A conversion circuit receiving and converting respective said channel digital representations to produce a resultant band limited analogue signal, said band limitation arising due to a characteristic of said channel digital representations;

a bandpass filter receiving and filtering each analogue channel signal, the band width to the start of the stop band of each said bandpass filter being wider than a respective band limited analogue channel signal and wider than the Nyquist bandwidth arising from the sampling rate of said D/A conversion circuit, whereby signal power in unwanted Nyquist zones is effectively removed; and a frequency translation circuit for abutting said multiple channel bandpass filtered analogue signals in the frequency domain without any guard bands between adjacent channel signals.

Preferably, the digital modulation circuit generates a summed time sequence of constituent impulse responses for each said symbol value. In one form, the characteristic of said digital representations is symbol rate and the paramter $\alpha$. The modulation circuit converts a binary data value to a symbol value, and includes a memory storing said impulse responses that correspond to said symbol values. Advantageously, the modulation circuit implements a Raised Root Cosine filter to generate said time sequences.

There is further provided a transceiver circuit including a transmission circuit as described above and a receiver circuit. The receiver circuit includes a radio frequency circuit to receive a multiple channel radio frequency signal, said multiple channels being abutted; a frequency translation circuit for separating said received multiple channel signals by frequency translation; an analogue-to-digital (A/D) conversion circuit for each channel, each said A/D conversion circuit converting a respective analogue channel signal to a digital representation; and a digital demodulation circuit receiving said channel signal digital representation and generating channel symbols therefrom, and generating multiple channel binary data from said symbols.

A receiver circuit also is disclosed.

There is yet further disclosed a method for transmitting data comprising:

forming a digital representation of multiple input data channels;

converting each said digital representation to a band limited analogue signal for each channel;

bandpass filtering each analogue signal for each channel, wherein the band width to the strat of the stop band of each said bandpass filter being wider than a respective band limited analogue channel signal and wider than the Nyquist bandwidth arising from the sampling rate of said D/A conversion circuit, such that signal power in unwanted Nyquist zones is effectively removed;

abutting said bandpass filtered channels in the frequency domain without any guard bands; and wirelessly transmitting said abutted channels.

DESCRIPTION OF THE DRAWINGS

In the drawings:

FIG. 1 is a schematic block diagram of a high data rate bi-directional wireless communication system

DETAILED DESCRIPTION

Introduction

Figure 2:
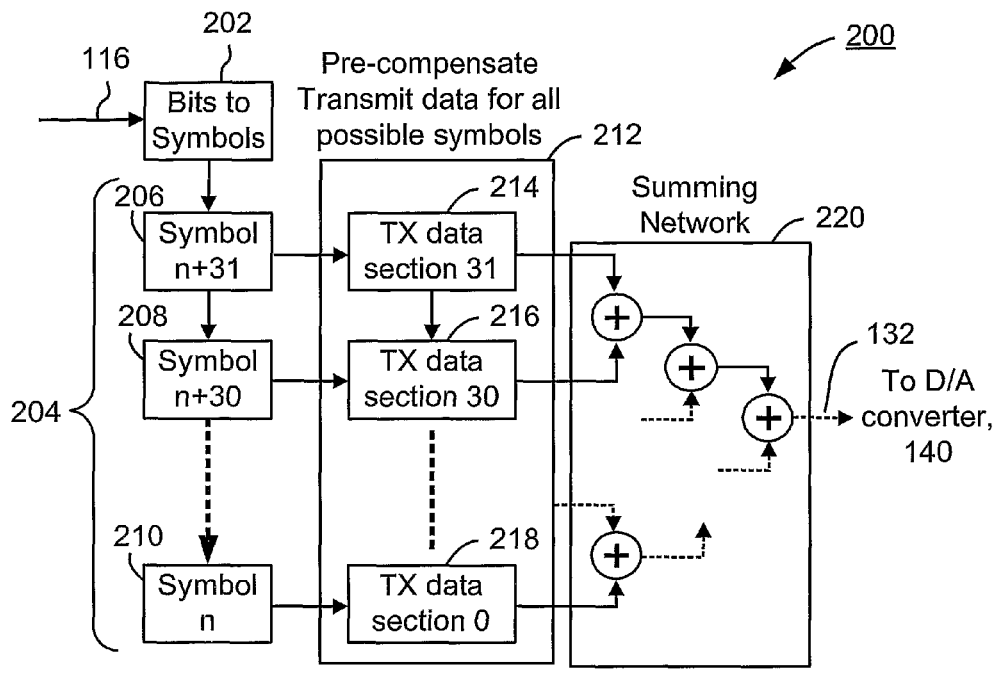
FIG. 2 is a schematic block diagram of components of a modulator circuit in the transmit path.

The embodiments described apply to the microwave and millimeter-wave portions of the radio spectrum, however it is to be understood that the invention has practical uses at frequencies both below and above these ranges. A requirement common to all such operational frequencies is that the width of spectrum available for use is larger than the Nyquist spectral width of the associated A/D or D/A converter used.

A multi-gigabit per second spectrally efficient wireless communication system in accordance with a preferred embodiment of this invention is a bi-directional point-to-point wireless system that implements guard-band free frequency-domain multiplexing of a plurality of (N) (high-speed) digital channels (occupying a width BWo each) into a single RF channel of N*BWo width. The digital modulation achieves a spectral efficiency greater than 1 bit/Hz. Therefore, across the N channels, an effective high data rate can be achieved.

FIG. 1 is a block diagram of a high data rate bidirectional wireless communication system 100, having a modulator and demodulator in the form of a digital modem 102, an intermediate frequency (IF) module 104, and a millimeter-wave front end 106 including is transmit and receive sections 108, 110.

Transmitter Path—Modulation

An input digital data stream 112 is provided to a digital interface 114 to be de-multiplexed into N digital data channels 116-122. N typically is in the range 4-16. These digital data channels 116-122 carry 'data' in the most general sense. The data may be arranged into 'packets' or 'blocks', for example, in certain communication applications. Each digital data channel 116-122 is passed to a respective Field Programmable Gate Array (FPGA) 124-130. The FPGAs 124-130 convert the respective channel input bit stream to corresponding symbols 132-138 (i.e. a one-to-one mapping). The symbols 132-138 are then output to a respective D/A converter 140-146.

The FPGAs 124-130 are a suitable device to implement a chosen form of band-limited modulation (in this case 8-PSK), but it is to be understood that other band-limited schemes, such as orthogonal frequency division multiplexing (OFDM) using Fast Fourier Transform (FFT) devices, also can be used. Application specific integrated circuits (ASICs) or discrete logic too can be used as a replacement for the FPGAs.

The circuit function 200 within each of the FPGAs 124-130 will now be described with reference to FIG. 2. In the preferred embodiment, each symbol comprises 3 bits (to implement 8-PSK modulation). The symbols are formed from the respective input data channel 116-122 by a bits-to-symbol (BTS) converter 202. These symbols then pass through a shift register 204 to generate symbol n+31 to symbol n. The outputs of each of the shift register elements 206-210 access a memory 212 that contains data for a section of the transmit waveforms. In the preferred embodiment the symbols are encoded as 8-PSK, meaning that the memory 212 stores a complete representation of the 8 possible transmit sequences corresponding to 8 possible states of a symbol. The memory 212 is broken up into 32 'TX data sections', where each such section has the form shown in FIG. 3, referred to below. The TX data sections 214-218 stores part of the waveform for the 8 possible transmit waveforms, and for these waveform each TX data section stores four time samples. Each symbol resides in an element 206-210 of the symbol shift register 204 for a period of four output sample samples. The symbol shift register elements 206-210 provide a 3-bit address to each of the TX data sections 214-218.

Figure 3:
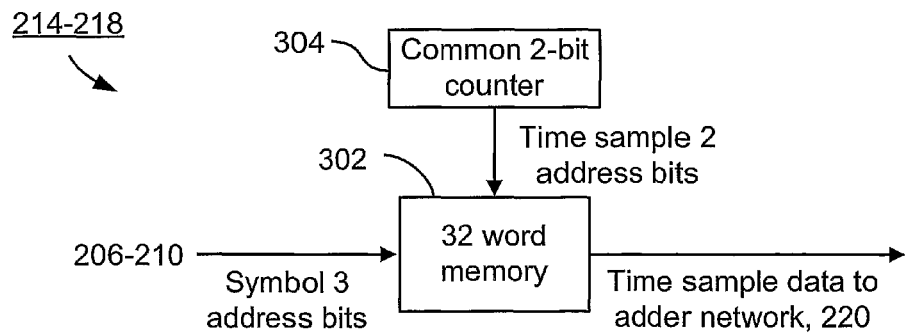
FIG. 3 is a schematic block diagram of a transmit data section circuit.

Referring now to FIG. 3, it can be seen that the TX data sections 214-218 are formed by a 32-word memory 302, driven by a 2-bit counter 304 and the 3-bit symbol data from the shift register elements 206-210. During the residency time, four data values are output in time sequence to the summing network 220.

The operation of the circuit 200 can be better understood if the transmission of one symbol, say symbol 3 [101], is considered. At time zero, the symbol enters the Symbol n+31 store 206, and for this and the next three time periods the 'TX data section n+31' section 214 outputs the data at addresses 10100, 10101, 10110 and finally 10111, where the first 3 bits are defined by the symbol and the last two by the counter. The symbol then passes to the symbol shift register element n+30 store 208 to drive the address inputs of TX data section 30. The data at these same four addresses is output in time series. The symbol then is passed to the symbol shifter register elements in turn to access the data for symbol 3 of TX data section 214-218 in correct time order. The outputs from the memory 212 are passed to the summing network 220 which has a constant delay from all inputs to the output. Thus a correct time sequence of digital data that represents symbol 3 appears at the output 132 of the summing network 220

For a given symbol location, the memory sections 214-218 implement the impulse response of a Root Raised Cosine (RRC) filter. In the preferred embodiment, the symbols in the modulator are based on the Hilbert transform of a RRC filter. When the frequency data is transformed into the time domain using an inverse FFT device, the real part corresponds to the in-phase part of the I component and the imaginary part of the Q component. The eight symbols for 8 PSK are a linear sum, with the symbol in address 0 corresponding the I component; in address 1 they are 0.707I+0.707Q (45 degree phase shift), for address 2 the values are from the Q data (90 degree phase shift), and so on. The modulator formed by the FPGAs 124-130 has a symbol rate of 500 Msamples/s with an α of 0.25 giving a total bandwidth of 625 MHz. Indeed, highest band usages would be achieved if each symbol was transmitted as a sync function, however, the time function has too great a duration.

Figure 4:
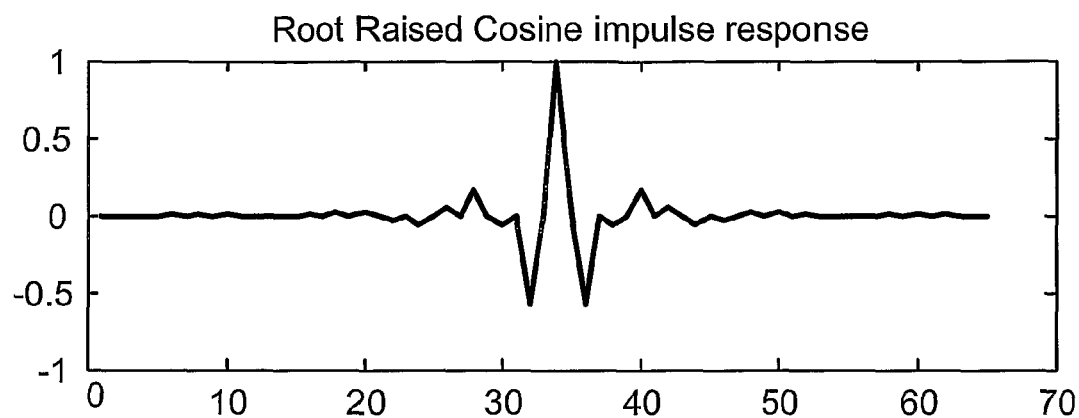
FIG. 4 shows the impulse response of a RRC filter.

FIG. 4 shows a characteristic symbol impulse response. The use of a RRC filter results in a symbol duration limited to a practical 32 time sample. A RRC filter results in a smooth transition of the resultant (band limited) summed digital values at the band edges when converted to the analogue domain by the respective D/A converter.

In summary, the FPGAs 124-130 each store a digital representation of all possible transmit signals. Each input symbol selects one of the stored representations and causes the chosen waveform to be output at the appropriate time. The respective summing network 220 adds all the representations with the appropriate time delay between all symbols of a channel.

Transmitter Path—Pre-Emphasis

Figure 5:
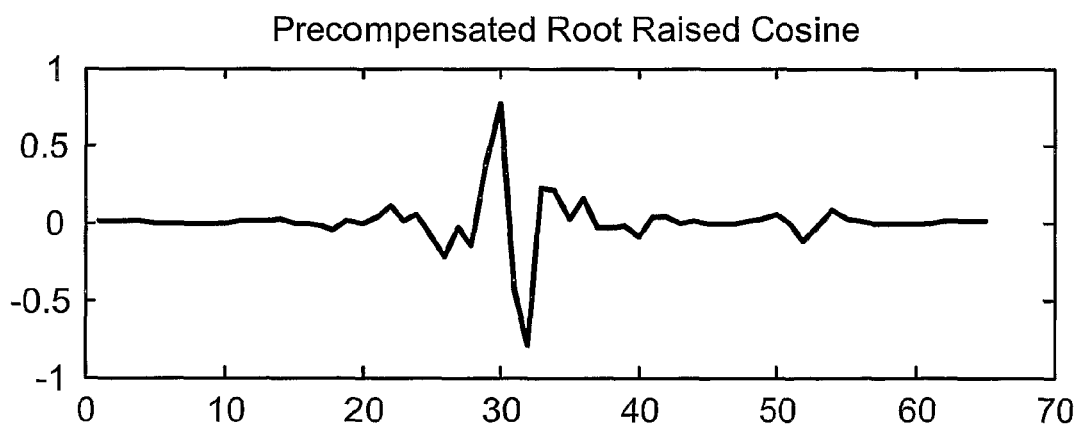
FIG. 5 shows the impulse response of a precompensated RRC filter.

The analogue filters and amplifiers in the baseband, IF and RF sections introduce unwanted frequency dependent phase and magnitude errors. Therefore, it may additionally be chosen to incorporate pre-compensation to the values stored in the memory sections 214-218. To compensate for phase and magnitude errors, a transfer function from the input to the D/A converters 140-146 to the A/D converters 282-288 is measured. This can be done in a number of ways, for example with pseudo-random sequences, chirps or the actual transmit data as the stimulus. Having calculated the transfer function, a correction to the transmit sequence is calculated that compensates for the frequency dependent errors. This compensated transmit sequence is longer than the original RRC filter impulse response, hence the longer length of the transmit sequence in the transmit modulator (128 samples), and example of which is shown in FIG. 5. It should be noted that the modulator is multiplier-free making it cheap to implement long transmit sequences.

In the demodulator part of the modem 102, the matched filters are implemented as FIR filters with one multiplier per tap. Hence it is preferable to keep this filter as short as possible. If the compensation is accurate the symbol at the output has the form of a RRC impulse response FIG. 4 and can be implemented with a 32 tap filter.

Transmitter Path—Generation of Baseband Signal

The symbols 132-138 are provided to the respective high-speed D/A converter 140-146, is preferably operating at 2 giga samples per second. A data rate per channel of 1.5 Gbps is preferred. One suitable D/A converter is the type MD653 made by Euvis, Inc. of Simi Valley, Calif., USA. The D/A converters are of the Return to Zero variety, and the wanted analogue signal is in the second Nyquist zone 1 to 2 GHz. The bandwidth of this baseband signal is 625 MHz (i.e. 1.188 to 1.813 GHz). The D/A converters 140-146 generate the (baseband) summed impulse responses of the symbols as an analogue signal representation. Thus, there is a direct computation of an analogue baseband signal from symbols. In the wanted Nyquist zone, the analogue data signal is bandlimited to 625 MHz, and outside this band the signal power is practically zero. The A/D limitation and truncation of the impulse responses means there is only low residual power outside the wanted Nyquist zone.

Referring again to FIG. 1, the analogue baseband signals 148-154 are provided to a respective analogue bandpass filter 156-162. The (baseband) bandpass filters 156-162 are used to eliminate all images/aliases of this baseband signal, and in particular those centred at 0.5 and 2.5 GHz. The BFPs 156-162 can have transition bands of up to 60%. The bandlimiting of the signal at the output of the A/D converter in effect results in wide low power bands between the image in each Nyquist band, and the transition band of the analogue bandpass filters 148-154 lies in these regions. In other words, the band width to the start of the stop band of each BPF is wider than the Nyquist bandwidth arising from the sampling rate of said D/A conversion circuit.

Figure 6:
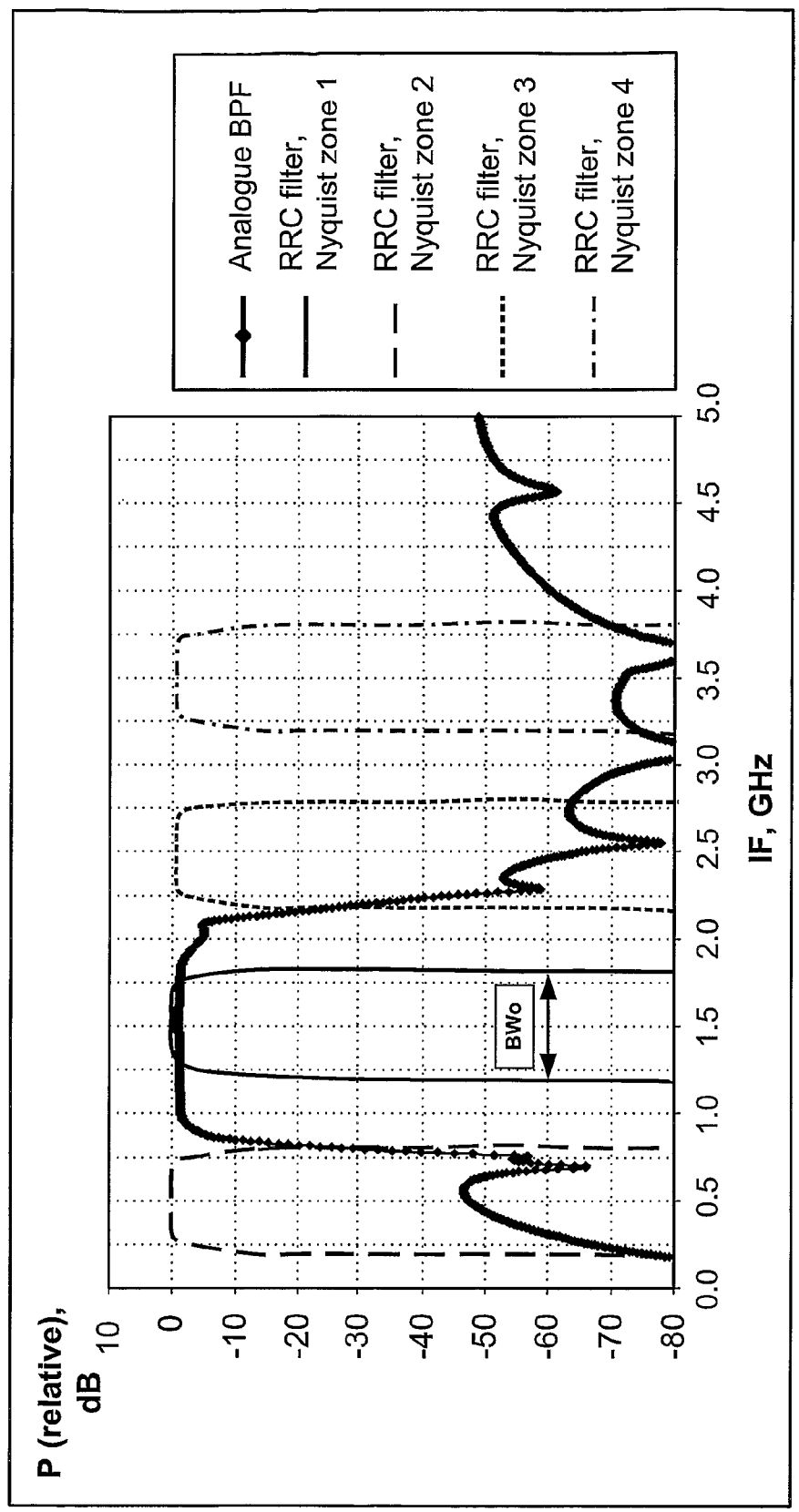
FIG. 6 shows constituent channel baseband transmission path frequency spectrums.

FIG. 6 illustrates a baseband signal combining one of the analogue band-pass filters (e.g. 156), and a Raised-Root Cosine Pulse shaped baseband signal (e.g. 148) showing the first four images of the RRC in the frequency domain, when a sync function envelope of a sampled signal is ignored and an exemplary frequency response of the BPF 156 is aligned with a second Nyquist zone. It is seen that the BPF 156 passes the image in the second Nyquist zone (1-2 MHz) and rejects the images in the other Nyquist zones.

Figure 7:
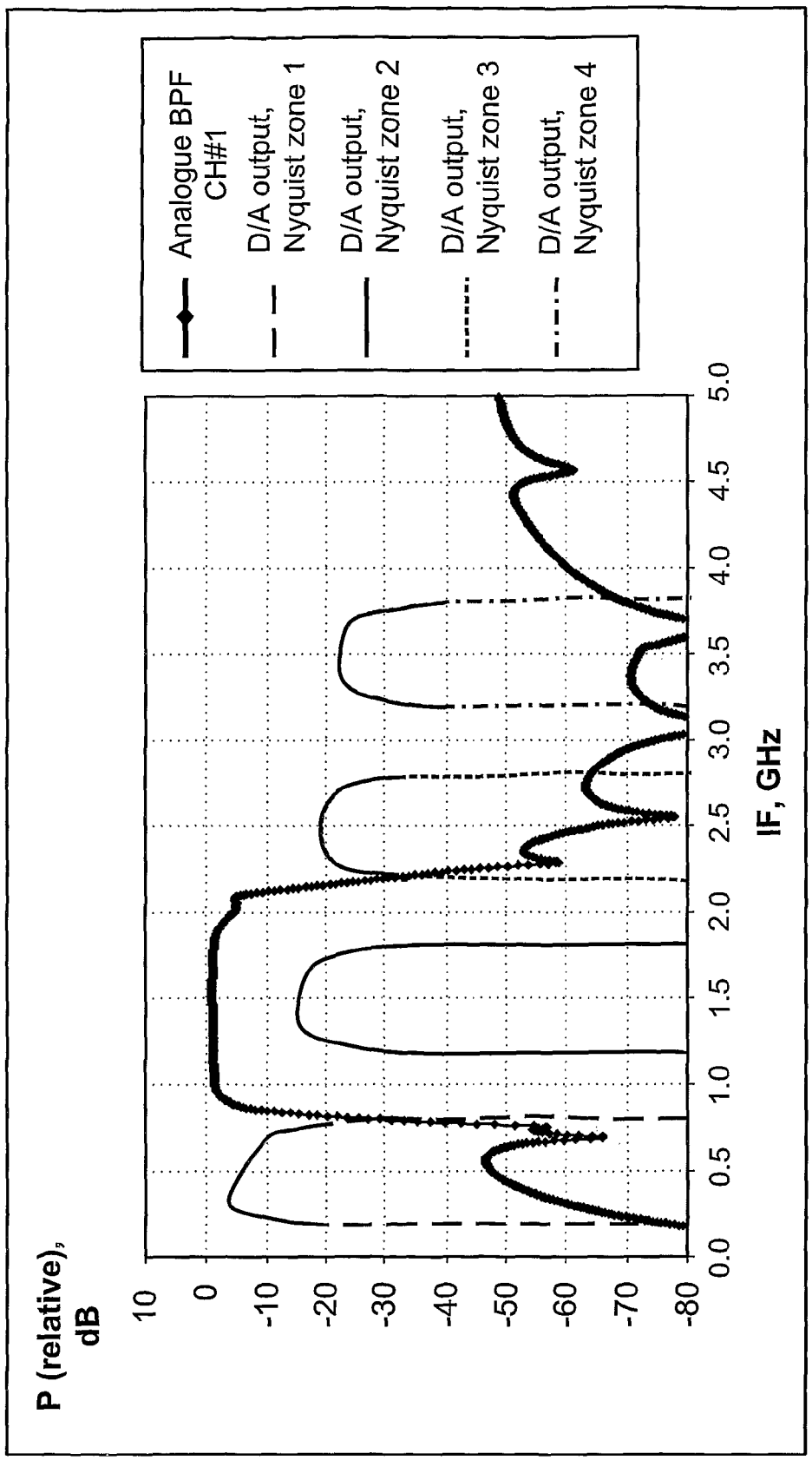
FIG. 7 shows constituent channel baseband transmission path frequency spectrums.

FIG. 7 illustrates combining one of the analogue band-pass filters (e.g. 156) and a Raised-Root Cosine pulse-shaped baseband signal showing a Return-to-Zero D/A output in first four Nyquist zones and an exemplary frequency response of the BPF aligned with a second Nyquist filter zone. The Return-to-Zero D/A adds a sinc function response to the is ideal response shown in FIG. 6. The first zero of this sinc function response is at 4 GHz (Nyquist zone images beyond this have not been shown).

Transmitter Path—Abutting Channels

The outputs of the BPF 156-162 are now be formed into an IF signal where the signal for each of the N channels abut.

The band-limited analogue baseband signals of one channel (i.e., 164) is passed straight to the IF power combiner 248. For the other N−1 channels the band-limited analogue baseband signals 166-170 are passed to a respective mixer 172-176, and mixed with a signal from local oscillators 178-182, the frequency of which is selected so that channels are offset by a multiple of 625 MHz. The resultant (N−1) channels thus are frequency translated to abut (i.e., to be contiguously spaced) without any guard band interval. They also abut the untranslated signal 164. A second bandpass filtering is performed to remove images resulting from the mixers 178-182, by respective bandpass filters 184-188. All N channels then are subject to a respective variable gain amplifier 190-196 to achieve gain equalisation. The generated analogue IF signals 240-246 (each occupying of width BWo) of each digital channel 116-122 form a combined IF bandwidth of N*BWo. Eight channels thus occupy 8×645 MHz=5 GHz. The IF channel signals 240-246 are summed in an IF power combiner circuit 248.

Figure 8:
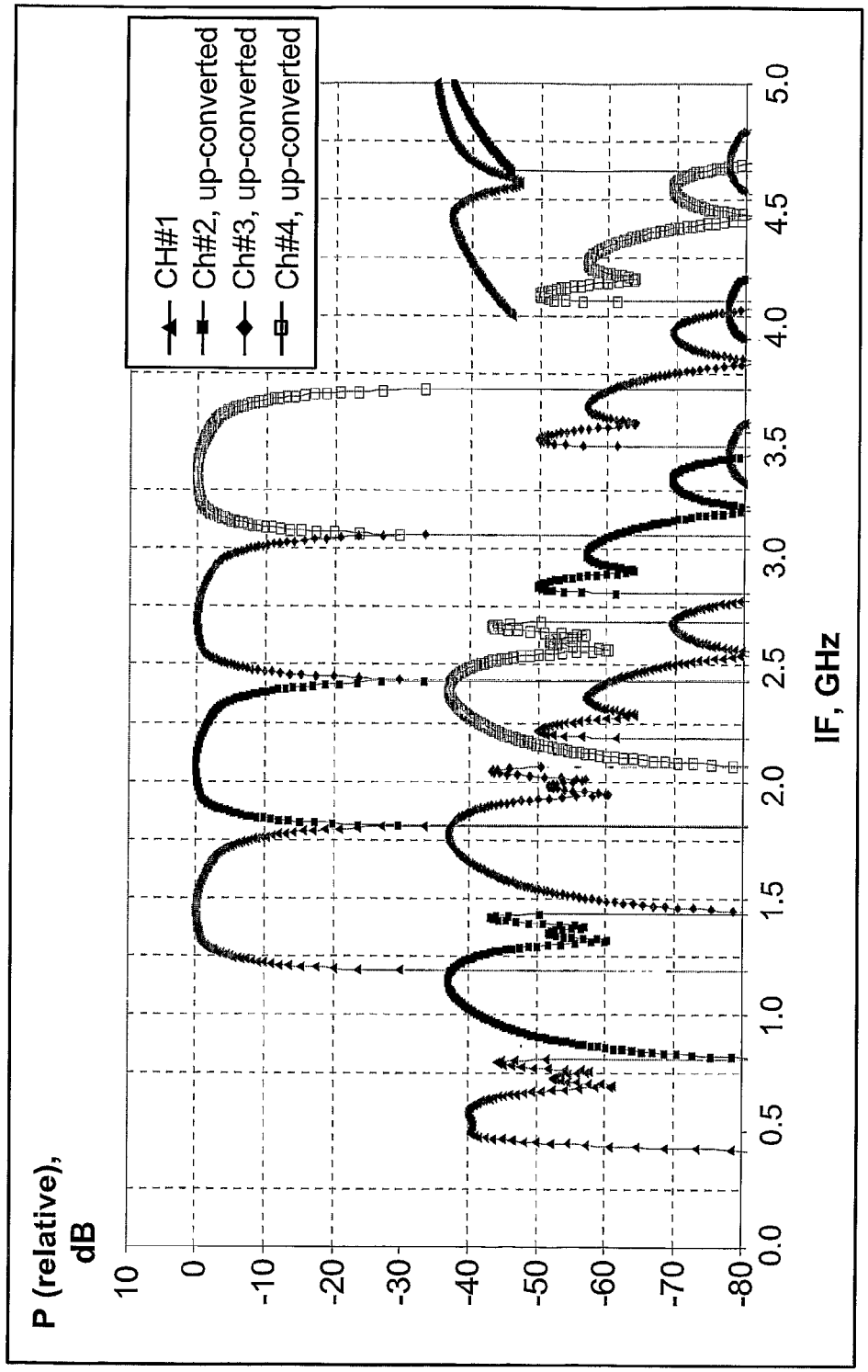
FIG. 8 shows IF channel transmission frequency spectrums.

FIG. 8 illustrates an exemplary combined IF signal for four frequency-domain multiplexed digital channels with BWo=625 MHz and total occupied bandwidth of BWo*4=2.5 GHz. Each IF input is derived from the product of the analogue filter and D/A output shown in FIG. 7. The four pass bands abutted want inputs to the IF power combiner are seen in the frequency range 1.188 to 3.688, with each of the four peaking at 0 dB (relative power). Also seen are responses from unwanted Nyquist bands due to the finite rejection of the analogue BFPs 156-162.

Figure 9:
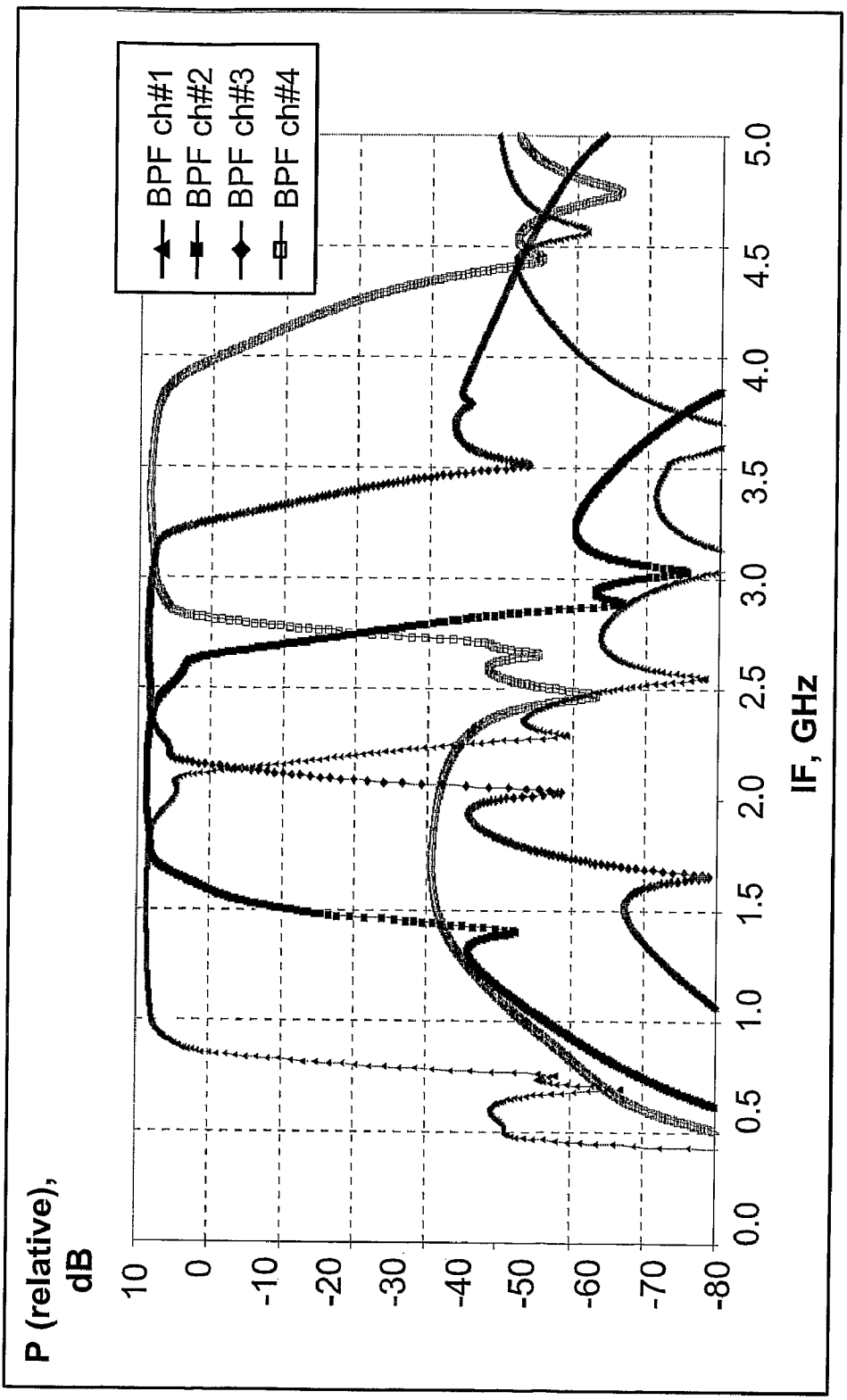
FIG. 9 shows IF channel transmission frequency spectrums.

FIG. 9 is an exemplary frequency response of analogue band-pass filters 'BFP ch #1' can be used for BFP 156-162 and is identical to that shown in FIGS. 6 and 7. The responses shown as 'BFP ch #s 2 to 4' are for image reject filters that follow the mixers 192-176 namely BFPs 184-188.

Transmitter Path—RF Stage

In the front end 106, the combined IF signal 250 is up-converted into a millimeter-wave carrier frequency, amplified by a Low Noise Amplifier (LNA) 252 and a power amplifier (PA) 254 and transmitted over line-of-sight path using a high-directivity antenna 256. To ease the cost to implement a radio frequency local oscillator 258 which increases with frequency, a sub-harmonically pumped mixer 260 is used. This mixer 260 is also an image mixer that provides some of the needed image rejection. The remainder of the image rejection is implemented in a bandpass filter 262 that follow the LNA 252.

Receiver Path

In general terms, in the receiver 110, a received signal is down-converted from the millimeter-wave carrier frequency into IF using sub-harmonically pumped mixer 280, and de-multiplexed in frequency domain into N sub-channels by the receiver path of the IF module 104, sampled by the high-speed A/D converters 282-288, de-coded by respective FPGAs 290-296 into N digital channels, and multiplexed by the digital interface 114 into a single digital stream 298.

In more detail, the received IF signal 300 undergoes a reverse processing to the transmitter path, firstly being demultiplexed into N-channels by a power dividing circuit 302 then passing through the respective automatic gain controlled amplifiers 304-310. For all channels, other channels are incompletely removed by bandpass filters 312-318. The indicated N−1 channels are frequency translated by a respective local oscillator and mixer 320-324 to a centre frequency of 1.5 GHz, and images removed by further respective bandpass filters 326-330. These filters also limit the degree of aliasing allowed. The analogue BPFs 312-318 and 326-330 each is 1.375 MHz wide at its stop band edges and centred on 1.5 GHz, whereas the band of interest is 625 MHz wide. Thus, as with the transmitter path, these filters have very relaxed specifications and are relatively easy to implement. The BFPs 312 to 330 each could have a response as is shown for BPF ch #1 in FIG. 9. In most cases there is unwanted power in the frequency bands below 1 GHz and above 2 GHz (for the highest and lowest frequency channels only one of these has unwanted power). This power will be aliased by the A/D converter 282-288. But the BPFs 312-330 limit the power to bands that are 1-1.188 GHz and 1.813-2.0 GHz, which is outside the wanted 625 MHz band.

There are now N baseband signals sampled by the A/D converters 282-288. These translate the signal in the 1-2 GHz band to baseband: 1 to 0 GHz respectively. This baseband signal includes power from other bands in the frequency ranges 0-188 MHz and 813-1000 MHz. Each FPGA 290-296 filters the data to the band of interest: 625 MHz centred on 500 MHz out of the 1 GHz available. The FPGAs 290-296 implement a RRC filter. It is seen that implementation of the RRC filter not only provides a matched filter for the received data but also rejects unwanted adjacent channel power and aliased adjacent channel power. With in the practical specification of the RRC filter the adjacent channel power is rejected completely even though there is no guard band between the channels.

Figure 10:
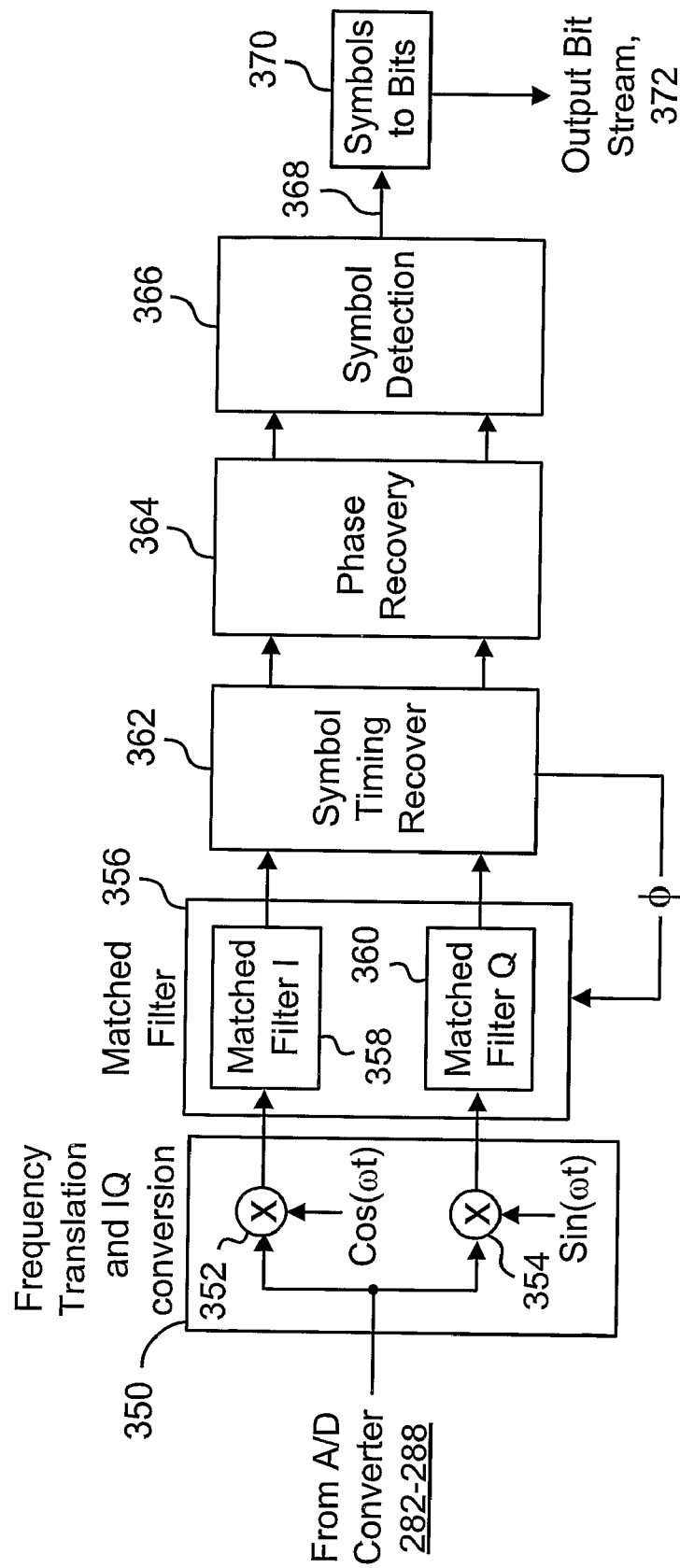
FIG. 10 is a schematic block diagram of components of a demodulation circuit in the receive path.

The receive demodulator implemented by the FPGAs 290-296 is shown in FIG. 10. In this implementation, the analogue data from the A/D converters 282-288 in each channel is a single real sequence 625 MHz wide centred at 1.5 GHz plus corrupting data from adjacent channels. Sampling this at 2 Gsamples/s translates the analogue input into a digital data stream centred on 0.5 GHz (first Nyquist zone). This is then translated by a translator and I/Q converter 350 to a zero carrier frequency in the digital domain with two mixers 352, 354. This translation produces images centred at 1 GHz that need to be removed. This is done with a low pass filter 356. This filter 356 implements a RRC filter, having I and Q component parts 358, 360 similar to that used for the transmit signal. The same impulse response as in the transmission path—translated down to a zero carrier frequency—is used as the matched filter 356. This filter 356 not only eliminates the unwanted components from adjacent channels but also band limits the signal to a total bandwidth of 625 MHz (±312.5 MHz).

This is followed by symbol timing recovery module 362 which calculates a phase correction ($\phi$) that is passed to the matched filter 356 to select one of 32 different time offsets for these filters. In this way sampling of the signal from the matched filters is centred on the symbols not on the symbol transition. This is then followed by a phase recovery module 364 to prevent constellation rotation, and then a symbol detection module 366 which produces a symbol data stream 368. This data stream 368 symbol is in turn passed to a symbol-to-bits converter 370 to generate an output bit stream 372.

There are other feasible implementations for this demodulation circuit. For example:
the symbol timing and phase recover can be swapped,
the matched filter could act on the real input data
the input data could be complex as is the case for a direct conversion IQ receiver.

Extensions

Embodiments of the communication system 100 allow for the use of higher order of digital modulation from 8-PSK to 32-PSK or 64-QAM. For example, with 64-QAM six bits are needed to define each symbol and the spectral efficiency is doubled to 4.8 bit per hertz even though the symbol rate is unchanged. This allows for transmitting 12 to 24 Gbps over 5 GHz of wireless bandwidth, and up to 48 Gbps over 10 GHz of bandwidth.

Performance

Figure 11:
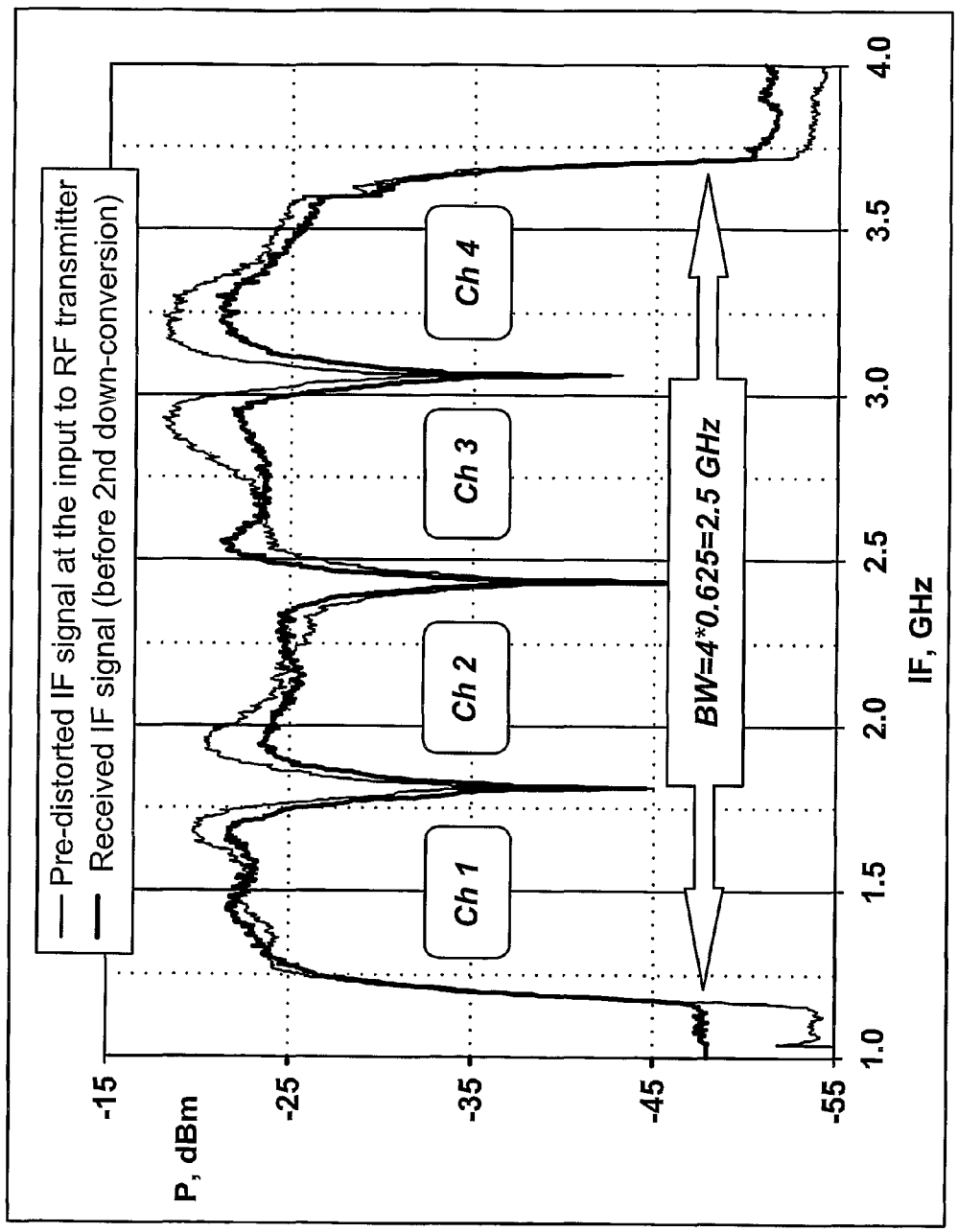
FIG. 11 shows frequency spectrums for pre-distorted IF transmit and receive channel signals.

FIG. 11 shows a pre-distorted IF signal at the input to RF transmitter and received IF signal (before de-multiplexing) measured by a spectrum analyser. For a four-channel implementation, each channel occupies BWo=625 MHz and carries a 1.5 Gbps Gray-coded 8PSK random PN sequence. Four channels are multiplexed into a single 2.5 GHz-wide IF signal using an optimal combination of the root-raised-cosine digital filters and linear-phase analogue filters. The abutment of the four channels without any guard bands is apparent. Both the input to the RF transmitter and the received IF signal are shown. It is seen the RF transmit signal has greater deviation from ideal RRC responses (flat in each of the four bands) as it includes compensation for both receiver and transmitter imperfections.

Figure 12:
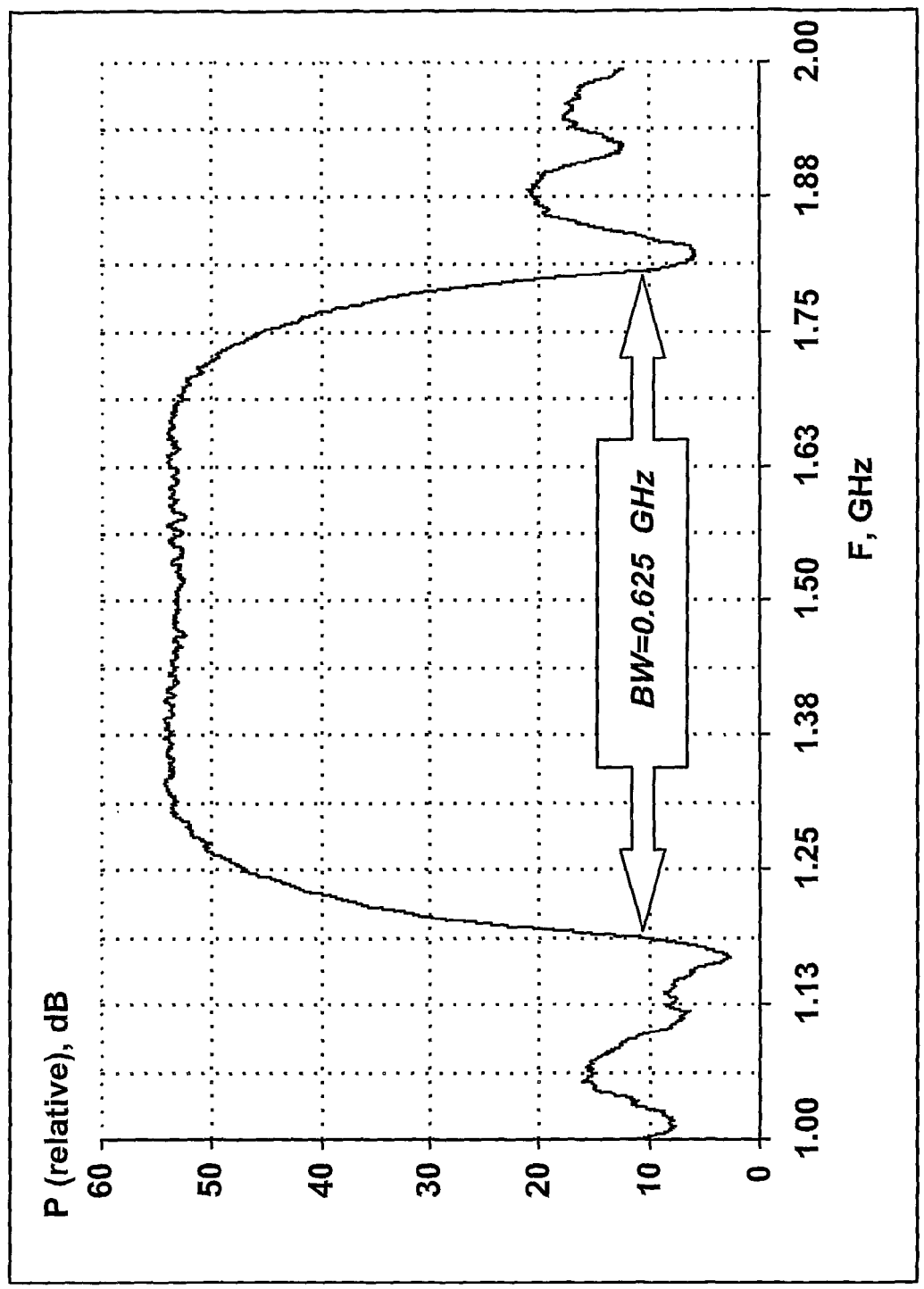
FIG. 12 is a plot of a received channel frequency spectrum.

FIG. 12 illustrates typical performance of a channel obtained by a fast Fourier transform on the A/D converter output with an IF response shown in FIG. 10.

Conclusion

Applications for the multi-gigabit wireless communications systems embodying the is invention include:
Front haul 3G and 4G Base Station/Distributed Antenna Solutions to replace fiber optic segments (~2 km range).
Back haul from 3G/4G Base Stations to central processing infrastructure using fiber optic segment replacement.
Enterprise applications—point-to-point Gigabit Wireless for Enterprise applications (between physical network segments—e.g. building to building communications (~2 km range).
Commercial applications in broadcast TV for mobile high definition cameras linking via wireless to fixed infrastructure networking facilities.
Consumer level WPAN applications allowing for low-cost millimeter-wave communications between multi-media devices (HDTV Cameras, DVD, Screen Technologies, PDAs, etc).
Military point-to-point/multipoint battlefield sensor integration.

Fixed to mobile, ground to air, ground to rail backhaul for 3G/4G and wired networking inside a moving vehicle.

Numerous alterations and modifications, as would be apparent to one skilled in the art, can be made without departing form the broad scope of the present invention. For example, the N-channels need not be of identical width BWo. It is not necessary to aggregate the data into a single data stream. For example the 6 Gbit/s system shown in the example to could be used to implement 5 Gigabit Ethernet paths with the spare 1 Gbit/s being used for overheads and error correction. It is also possible to use the system for a point to multipoint without relying on antenna directivity. Each of the multipoint units would use a subset of the frequency channels and the single collection point would transmit and receive data on the appropriate frequency channel(s) for each multipoint unit. (An example of this application might be multiple roving TV cameras communicating to a central control van).

The invention claimed is:

1. A circuit comprising:
    a digital modulation circuit receiving multiple channel binary data, and for each channel generating a digital representation;
    a digital-to-analogue (D/A) conversion circuit for each data channel, each said D/A conversion circuit receiving and converting respective said channel digital representations at a sampling rate to produce a resultant analogue signal that is band limited within each Nyquist zone of the sampling rate of said D/A conversion circuit, said band limitation being dependent on a characteristic of said channel digital representations;
    a bandpass filter receiving and filtering each analogue signal, the band width at the edges of the stop band of each said bandpass filter being wider than a respective band limited analogue signal and wider than the Nyquist bandwidth arising from the sampling rate of said D/A conversion circuit, whereby signal power in unwanted Nyquist zones is effectively removed; and
    a frequency translation circuit for translating said multiple channel bandpass filtered analogue signals in the frequency domain such that said multiple channel bandpass filtered analogue signals are each offset in the frequency domain by the band limitation of the band limited analogue signal, thereby abutting said multiple channel bandpass filtered analogue signals without any guard bands between adjacent channel signals.

2. A circuit according to claim 1, wherein said digital modulation circuit converts one of more channel binary data values to a symbol value, and generates a summed time sequence of digital data values implementing constituent impulse responses for each said symbol value.

3. A circuit according to claim 1, wherein said characteristic of said digital representations is a symbol rate and a parameter α.

4. A circuit according to claim 2, wherein said digital modulation circuit includes a memory storing said digital data values implementing said impulse responses that correspond to said symbol values.

5. A circuit according to claim 2, wherein said symbols are at least 3 bits in length.

6. A circuit according to claim 2, wherein said digital modulation circuit implements a Raised Root Cosine filter to generate said time sequences.

7. A circuit according to claim 1, wherein said digital modulation circuit implements any one of 8 value phase shift keying (8-PSK), or 16 or 64 value quadrature amplitude modulation.

8. A circuit according to claim 1, wherein said band limited analogue channel signal occupies no more than 40% of the total bandpass filter width as measured to the edge of the stop bands.

9. A circuit according to claim 1, further comprising a digital demultiplexer circuit, demultiplexing input binary data into said multiple channel binary data.

10. A circuit according to claim 1, wherein there are at least 4 said channels.

11. A circuit according to claim 1, further comprising a radio frequency circuit to combine said abutted channel signals and transmit said combine signals at radio frequencies.

12. A method for transmitting data comprising:
    forming a limited duration digital representation of multiple input data channels;
    converting each said digital representation to an analogue signal at a sampling rate, wherein the analogue signal is band limited within each Nyquist zone of the sampling rate for each channel;
    bandpass filtering each analogue signal for each channel, wherein the band width at the edges of the stop band of each said bandpass filter being wider than a respective band limited analogue signal and wider than the Nyquist bandwidth arising from the sampling rate of said conversion, whereby signal power in unwanted Nyquist zones is effectively removed;
    translating said bandpass filtered analogue signals in the frequency domain such that said bandpass filtered analogue signals are each offset in the frequency domain by the band limitation of the band limited analogue signal, thereby abutting said multiple channel bandpass filtered analogue signals without any guard bands; and
    wirelessly transmitting said abutted bandpass filtered analogue signals.

13. A transceiver comprising:
(a) a transmitter circuit including:
    a digital modulation circuit receiving multiple channel binary data, and for each channel generating a digital representation;
    a digital-to-analogue (D/A) conversion circuit for each data channel, each said D/A conversion circuit receiving and converting respective said channel digital representations at a sampling rate to produce a resultant analogue signal that is band limited within each Nyquist zone of the sampling rate of said D/A conversion circuit, said band limitation being dependent on a characteristic of said channel digital representations;
    a bandpass filter receiving and filtering each analogue signal, the band width at the edges of the stop band of each said bandpass filter being wider than a respective band limited analogue signal and wider than the Nyquist bandwidth arising from the sampling rate of said D/A conversion circuit, whereby signal power in unwanted Nyquist zones is effectively removed; and
    a frequency translation circuit for translating said multiple channel bandpass filtered analogue signals in the frequency domain such that said multiple channel bandpass filtered analogue signals are each offset in the frequency domain by the band limitation of the band limited analogue signal, thereby abutting said multiple channel bandpass filtered analogue signals without any guard bands between adjacent channel signals; and (b) a receiver circuit including:
- a radio frequency circuit to receive a multiple channel radio frequency signal, said multiple channels being abutted;
- a frequency translation circuit for separating said received multiple channel signals by frequency translation;
- an analogue-to-digital (A/D) conversion circuit for each channel, each said A/D conversion circuit converting a respective analogue channel signal to a digital representation; and
- a digital demodulation circuit receiving said channel signal digital representation and generating channel symbols therefrom, and generating multiple channel binary data from said symbols.

14. A transceiver according to claim 13, wherein said receiver further includes a bandpass filter for each separate channel signal to filter said channel signals before passing the signals to the respective A/D conversion circuit.

15. A transceiver according to claim 13, wherein said demodulation circuit includes a filter component matching channel signals in the modulation circuit of the transmitter circuit.

16. A transceiver according to claim 13, wherein
said transmitter circuit further includes a digital demultiplexer, demultiplexing input binary data into said multiple channel binary data; and
said receiver circuit further includes a digital multiplexer, multiplexing said binary channel data in to a single output data stream.

* * * * *